United States Patent
Saotome

(10) Patent No.: US 11,760,219 B2
(45) Date of Patent: Sep. 19, 2023

(54) POWER SUPPLY SYSTEM AND MOVING BODY

(71) Applicant: HONDA MOTOR CO., LTD., Tokyo (JP)

(72) Inventor: Koji Saotome, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/559,174

(22) Filed: Dec. 22, 2021

(65) Prior Publication Data

US 2022/0203851 A1 Jun. 30, 2022

(30) Foreign Application Priority Data

Dec. 28, 2020 (JP) ................ 2020-219256

(51) Int. Cl.
| | |
|---|---|
| *B60L 53/20* | (2019.01) |
| *B60L 50/60* | (2019.01) |
| *H02J 7/14* | (2006.01) |
| *B60L 50/53* | (2019.01) |
| *H02J 7/00* | (2006.01) |

(52) U.S. Cl.
CPC .............. *B60L 53/20* (2019.02); *B60L 50/53* (2019.02); *B60L 50/60* (2019.02); *H02J 7/0063* (2013.01); *H02J 7/0068* (2013.01); *H02J 7/14* (2013.01); *B60L 2210/10* (2013.01)

(58) Field of Classification Search
CPC ...... B60L 53/20; B60L 50/60; B60L 2210/10; B60L 1/006; B60L 53/22; B60L 53/31; H02J 7/0063; H02J 7/0068; H02J 7/14; H02J 2207/20; H02J 7/02; H02J 2310/48; Y02T 10/70; Y02T 10/7072; Y02T 10/92; Y02T 90/14; H02M 3/33576; H02M 3/33584; H02M 7/5387; H02M 7/797; H02P 27/08
See application file for complete search history.

(56) References Cited

U.S. PATENT DOCUMENTS

2015/0291035 A1* 10/2015 Nagashita ............... H02M 1/10
 307/9.1
2018/0361865 A1* 12/2018 Bando ..................... B60L 53/30

FOREIGN PATENT DOCUMENTS

JP 2014-103849 A 6/2014

* cited by examiner

*Primary Examiner* — Lincoln D Donovan
*Assistant Examiner* — Alex W Lam
(74) *Attorney, Agent, or Firm* — Carrier, Shende & Associates P.C.; Joseph P. Carrier; Jeffrey T. Gedeon

(57) ABSTRACT

A power supply system supplies power from a moving body including a battery and an electric drive source to an external power supply target. The power supply system includes a DC-DC converter circuit provided in an internal power feeding path between the battery and the electric drive source, a connection circuit capable of electrically connecting the DC-DC converter circuit to a power receiving terminal (power supply inlet) of the power supply target, and a control device for controlling the DC-DC converter circuit so as to supply surplus power of the battery to the power supply target via the DC-DC converter circuit and the connection circuit.

16 Claims, 10 Drawing Sheets

US 11,760,219 B2

POWER SUPPLY SYSTEM AND MOVING BODY

CROSS-REFERENCE TO RELATED APPLICATIONS

This application is based upon and claims the benefit of priority from Japanese Patent Application No. 2020-219256 filed on Dec. 28, 2020, the contents of which are incorporated herein by reference.

BACKGROUND OF THE INVENTION

Field of the Invention

The present invention relates to a moving body including a battery and an electric drive source, and a power supply system that supplies power from the moving body to an external power supply target.

Description of the Related Art

JP 2014-103849 A discloses a technique for charging a battery of a first vehicle by supplying electric power from a power supply station to the first vehicle. This technique prevents overcharging of the battery of the first vehicle by reducing the charging power. In this technique, the first vehicle and a second vehicle are connected by a charging cable. In this technique, surplus electric power of the first vehicle is supplied to the second vehicle.

SUMMARY OF THE INVENTION

JP 2014-103849 A does not disclose a specific circuit configuration for realizing power supply from the first vehicle (moving body) to the second vehicle (power supply target).

An object of the present invention is to solve the above-described problems.

According to a first aspect of the present invention, there is provided a power supply system for supplying power from a moving body including a battery and an electric drive source to an external power supply target, the power supply system including: a DC-DC converter circuit provided in an internal power feeding path between the battery and the electric drive source; a connection circuit configured to electrically connect the DC-DC converter circuit and a power receiving terminal of the power supply target; and a control device configured to control the DC-DC converter circuit in a manner that surplus power of the battery is supplied to the power supply target via the DC-DC converter circuit and the connection circuit.

According to the second aspect of the present invention, there is provided a moving body including a battery and an electric drive source, the moving body being configured to supply power to an external power supply target, the moving body including: a DC-DC converter circuit provided in an internal power feeding path between the battery and the electric drive source, the DC-DC converter circuit including an internal reactor and a switching circuit provided between the internal reactor and the electric drive source; a reactor attachment portion configured to hold an external reactor in a manner that the external reactor and the internal reactor form a transformer, the external reactor being electrically connected to the power supply target; and a control device configured to control the DC-DC converter circuit in a manner that surplus power of the battery is supplied to the power supply target via the transformer when the external reactor is held by the reactor attachment portion.

According to the present invention, it is possible to supply power to an external power supply target by using an originally-provided circuit in an internal power feeding path of a moving body.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

1. First Embodiment

[1-1. Configuration of Power Supply System 10]

Figure 1:
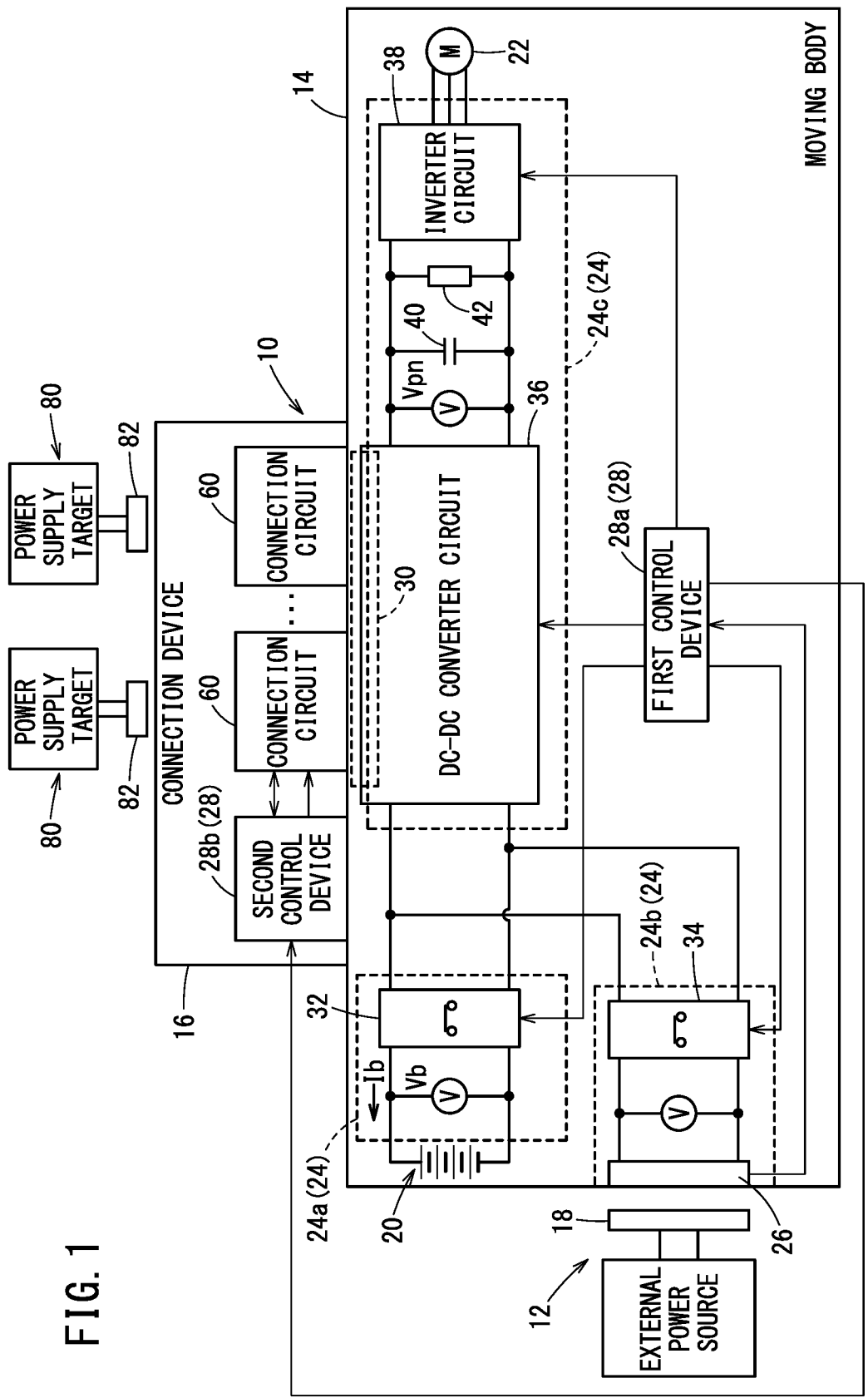
FIG. 1 is a diagram illustrating a configuration of the power supply system according to a first embodiment.

FIG. 1 is a diagram illustrating a configuration of a power supply system 10 according to a first embodiment. The power supply system 10 includes an external power source 12, a moving body 14, and a connection device 16. The power supply system 10 can supply power from the moving body 14 to a power supply target 80 located outside of the moving body 14 via the connection device 16. For example, the power supply target 80 is another moving body 14, a power storage device, or the like.

[1-1-1. External Power Source 12]

The external power source 12 is a charging station that rapidly charges the battery 20 of the moving body 14. The external power source 12 includes a charging gun 18. The charging gun 18 is attachable to and detachable from a charging inlet 26 of the moving body 14. The external power source 12 supplies power to the battery 20 of the moving body 14 via the charging gun 18. The external power source 12 may be a device that performs non-contact charging.

[1-1-2. Moving Body 14]

The moving body 14 includes a battery 20, an electric drive source 22, an internal power feeding path 24, a charging inlet 26, a first control device 28a, and a reactor attachment portion 30. The moving body 14 operates the electric drive source 22 by electric power of the battery 20 to generate propulsive force. In the first embodiment, the battery 20 can be charged by electric power supplied from the external power source 12. When the electric drive source 22 generates electric power, the battery 20 can be charged with the electric power supplied from the electric drive source 22. The moving body 14 is, for example, a vehicle such as an electric vehicle (EV) or a plug-in hybrid vehicle (PHV). The moving body 14 may be a transport machine such as a ship or an aircraft. The moving body 14 may be a drone.

The battery 20 is a chargeable power storage device. For example, the battery 20 is a lithium ion battery or the like. The electric drive source 22 generates a propulsive force of the moving body 14. The electric drive source 22 is an electric motor that also functions as a generator.

The internal power feeding path 24 is constituted by conducting wires (or a wiring pattern of a circuit board), elements, or the like. The internal power feeding path 24 includes a first power feeding path 24a, a second power feeding path 24b, and a third power feeding path 24c.

The first power feeding path 24a is provided between the battery 20 and the second power feeding path 24b and between the battery 20 and the third power feeding path 24c. The first power feeding path 24a performs power transmission from the second power feeding path 24b to the battery 20. The first power feeding path 24a performs power transmission between the battery 20 and the third power feeding path 24c. The first power feeding path 24a includes a first contactor 32. The first contactor 32 is a switch that is switched between on and off. The first contactor 32 is turned on by an excitation current being supplied from the first control device 28a.

The second power feeding path 24b is provided between the charging inlet 26 and the first power feeding path 24a and between the charging inlet 26 and the third power feeding path 24c. The second power feeding path 24b performs power transmission from the external power source 12 connected to the charging inlet 26 to the first power feeding path 24a. The second power feeding path 24b performs power transmission from the external power source 12 to the third power feeding path 24c. The second power feeding path 24b includes a second contactor 34. The second contactor 34 is a switch that is switched between on and off. The second contactor 34 is turned on by an excitation current being supplied from the first control device 28a.

The third power feeding path 24c is provided between the first power feeding path 24a and the electric drive source 22 and between the second power feeding path 24b and the electric drive source 22. Further, the third power feeding path 24c is provided between the first power feeding path 24a and a connection circuit 60 and between the second power feeding path 24b and the connection circuit 60. The connection circuit 60 is attached to the outside of the moving body 14. The third power feeding path 24c performs power transmission between the first power feeding path 24a and the electric drive source 22. The third power feeding path 24c performs power transmission from the first power feeding path 24a to the connection circuit 60. The third power feeding path 24c performs power transmission from the second power feeding path 24b to the connection circuit 60.

The third power feeding path 24c can control power transmission among the battery 20, the electric drive source 22, the external power source 12, and the connection circuit 60 in accordance with a control signal output by the first control device 28a. The third power feeding path 24c can control selective switching of a source of power supply in accordance with a control signal output from the first control device 28a. The third power feeding path 24c can control selective switching of a destination of power supply in accordance with a control signal output from the first control device 28a. The third power feeding path 24c can control the supplied amount of power (the power feeding amount) in accordance with a control signal output by the first control device 28a.

Figure 2:
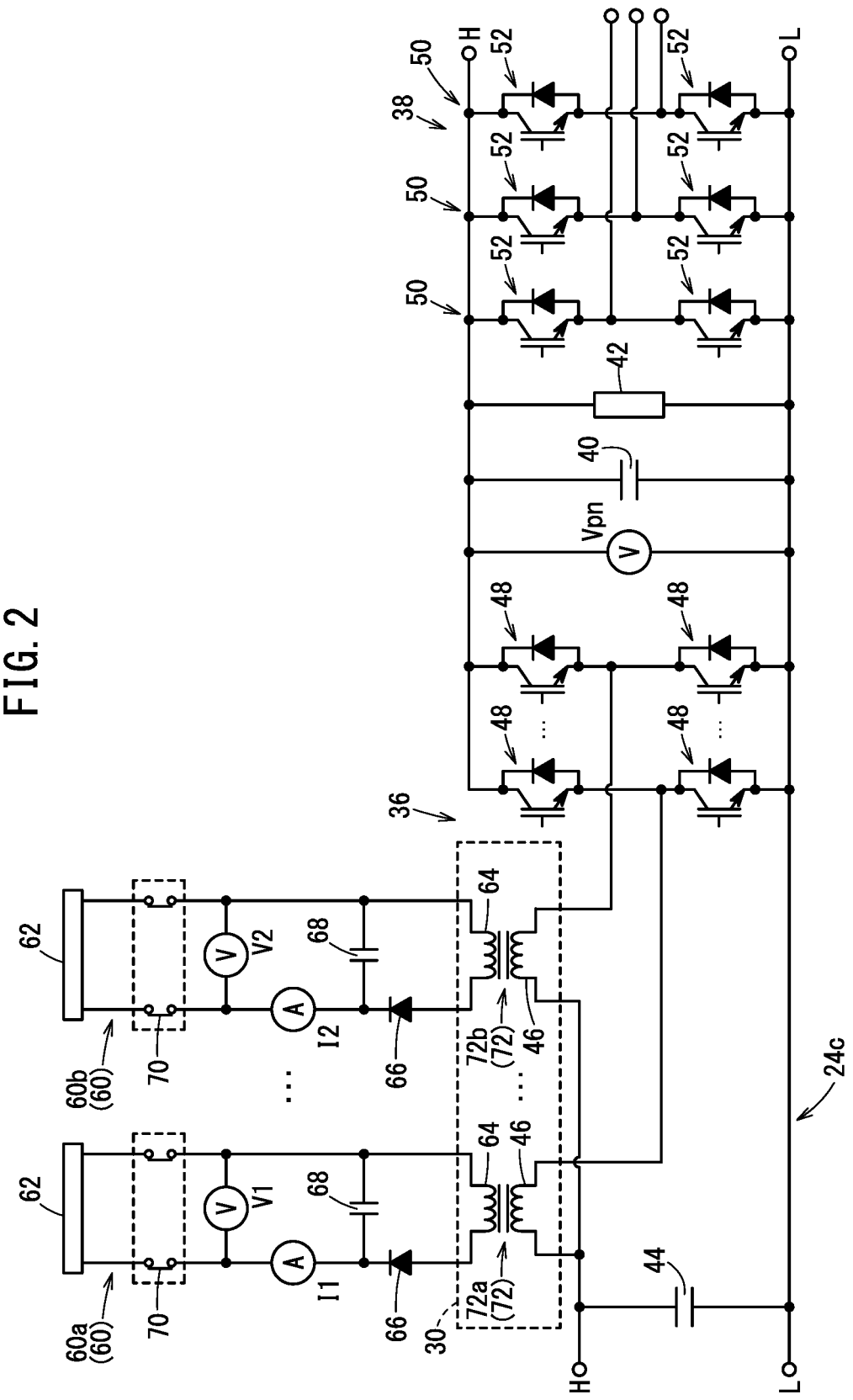
FIG. 2 is a diagram illustrating a third power feeding path according to the first embodiment and a connection circuit according to the first embodiment.

FIG. 2 is a diagram illustrating the third power feeding path 24c according to the first embodiment and the connection circuit 60 according to the first embodiment. The third power feeding path 24c includes a DC-DC converter circuit 36, an inverter circuit 38, a smoothing capacitor 40, and a discharge unit 42 (for example, a resistor).

One end of the smoothing capacitor 40 and one end of the discharge unit 42 are connected to a high-side (H side or + side) secondary terminal of the DC-DC converter circuit 36 and a high-side primary terminal of the inverter circuit 38. The other end of the smoothing capacitor 40 and the other end of the discharge unit 42 are connected to a low-side (L side or − side) secondary terminal of the DC-DC converter circuit 36 and a low-side primary terminal of the inverter circuit 38.

A primary terminal of the DC-DC converter circuit 36 is connected to the first power feeding path 24a and the second power feeding path 24b. The secondary terminal of the DC-DC converter circuit 36 is connected to the inverter circuit 38. The DC-DC converter circuit 36 includes a smoothing capacitor 44, an internal reactor 46, and two high-side and low-side switch units 48. One end of the smoothing capacitor 44 is connected to a high-side primary terminal. The other end of the smoothing capacitor 44 is connected to a low-side primary terminal. One end of the internal reactor 46 is connected to a high-side primary terminal. The other end of the internal reactor 46 is connected to the midpoint between the two switch units 48. The two switch units 48 are connected in series. Each switch unit 48 includes a switch element and a diode. The switch element of each switch unit 48 and the diode of each switch unit 48 are connected in parallel with each other. As shown in FIG. 2, the DC-DC converter circuit 36 may include a plurality of sets each including an internal reactor 46 and two switch units 48. The circuits of the plurality of sets are connected in parallel with each other.

Each switch element of the switch unit 48 is controlled by the first control device 28a, so that the DC-DC converter circuit 36 steps up the DC (direct current) voltage input to the primary terminal at a step-up rate corresponding to a control signal and outputs the stepped-up voltage from the secondary terminal. Further, the DC-DC converter circuit 36 steps down the DC voltage input to the secondary terminal at a step-down rate corresponding to a control signal, and outputs the stepped-down voltage from the primary terminal.

The primary terminal of the inverter circuit 38 is connected to the DC-DC converter circuit 36. The secondary terminal of the inverter circuit 38 is connected to the electric drive source 22. The inverter circuit 38 includes arms 50 of three phases of a U phase, a V phase, and a W phase. The three phase arms 50 are connected in parallel with each other. Each arm 50 includes two switch units 52 of a high side and a low side. In each arm 50, the two switch units 52 are connected in series to each other. Each switch unit 52 includes a switch element and a diode connected in parallel with each other. In each arm 50, a midpoint between the two switch units 52 serves as an output portion of three phase AC (alternate current) power.

The switch elements of the switch units 52 are controlled by the first control device 28a, whereby the inverter circuit 38 converts DC power input to the primary terminal into three phase AC power and outputs the three phase AC power from the secondary terminal. The inverter circuit 38 converts three phase AC power input to the secondary terminal into DC power and outputs the DC power from the primary terminal.

Returning to FIG. 1, the description of the power supply system 10 will be continued. The first control device 28a is part of the control device 28 of the power supply system 10. The first control device 28a is an ECU. The ECU includes a control circuit, a storage device, an I/O device, a communication device, and a current output circuit (none of which are illustrated).

The control circuit includes, for example, a processor such as a CPU. In this case, a program stored in the storage device is executed by the processor, thereby realizing each function. The control circuit may include, for example, an integrated circuit such as an ASIC or a FPGA. The control circuit may include an electronic circuit including a discrete device.

The storage device includes, for example, a RAM and a ROM. The storage device stores various types of information input by a user in addition to a program executed by the control circuit. The various types of information are, for example, the order of power supply, the timing of power supply, and the like when a plurality of power supply targets 80 are simultaneously connected to the moving body 14.

The I/O device is used for transmitting and receiving information. That is, the I/O device is used when the control circuit receives information from each device (the current/voltage sensor, the charging inlet 26, and the like) provided in the moving body 14 and transmits information to each device. The communication device receives information from a second control device 28b of the connection device 16. The communication device also transmits information to the second control device 28b.

The first control device 28a receives a detection signal indicating a detected value of voltage or current from each sensor provided in the internal power feeding path 24. Further, as described above, the first control device 28a outputs control signals to the switch units 48 of the DC-DC converter circuit 36 and the switch units 52 of the inverter circuit 38.

After receiving a connection signal from the charging inlet 26, the first control device 28a supplies an excitation current to the first contactor 32 and the second contactor 34. The connection signal output by the charging inlet 26 indicates that the charging gun 18 is attached to the charging inlet 26. When the connection device 16 is attached to the moving body 14, the first control device 28a outputs a power supply start signal to the second control device 28b of the connection device 16 in accordance with the charging state of the battery 20. The first control device 28a instructs the second control device 28b on the power supply target (connection circuit 60).

The first control device 28a receives a connection signal indicating that the charging gun 18 has been removed from the charging inlet 26. After receiving the connection signal, the first control device 28a stops supply of the excitation current to the first contactor 32 and the second contactor 34. When the connection device 16 is attached to the moving body 14, the first control device 28a outputs a power supply stop signal to the second control device 28b of the connection device 16.

The reactor attachment portion 30 is provided on the body of the moving body 14. One reactor attachment portion 30 is provided for one internal reactor 46. The connection device 16 can be attached to and detached from the reactor attachment portion 30. The reactor attachment portion 30 holds an external reactor 64 provided in the connection device 16, in a state where the connection device 16 is attached.

[1-1-3. Connection Device 16]

The connection device 16 is a coupling device interposed between the reactor attachment portion 30 of the moving body 14 and the power supply inlet 82 of the power supply target 80 when power is supplied from the moving body 14 to the power supply target 80. The connection device 16 electrically connects the internal power feeding path 24 of the moving body 14 and a power feeding path (not illustrated) of the power supply target 80. The connection device 16 includes one or more connection circuits 60 and a second control device 28b.

As shown in FIG. 2, the connection circuit 60 includes a connector 62, an external reactor 64, a diode 66, a capacitor 68, and a power supply contactor 70. The connector 62 has a pair of power receiving terminals connectable to the power supply inlet 82 (FIG. 1) of the power supply target 80. A parallel circuit is connected between one power receiving terminal and the other power receiving terminal of the connector 62. In the parallel circuit, the capacitor 68 and a series circuit are connected in parallel. In the series circuit, the external reactor 64 and the diode 66 are connected in series. Further, the power supply contactor 70 is provided between the parallel circuit and the connector 62.

The external reactor 64 can be attached to the reactor attachment portion 30 of the moving body 14 from the outside. When the external reactor 64 is held by the reactor attachment portion 30, a transformer 72 is formed by the internal reactor 46 and the external reactor 64. The transformer 72 may be a forward transformer. The transformer 72 may be a flyback transformer. Each of the internal reactor 46 and the external reactor 64 is provided with a core. When the external reactor 64 is held by the reactor attachment portion 30, the core of the internal reactor 46 and the core of the external reactor 64 are coupled to each other.

The second control device 28b is part of the control device 28 of the power supply system 10. Similarly to the first control device 28a, the second control device 28b includes a control circuit, a storage device, an I/O device, a communication device, and a current output circuit (none of which are illustrated).

The second control device 28b receives a detection signal indicating a detected value of voltage or current from each sensor provided in each connection circuit 60. The second control device 28b transmits information indicating each detected value to the first control device 28a. When receiving a power supply start signal from the first control device 28a, the second control device 28b supplies an excitation current to a power supply contactor 70 of the connection circuit 60 indicated by the power supply start signal.

[1.2. Power Supply from Moving Body 14 to Power Supply Target 80]

Figure 3:
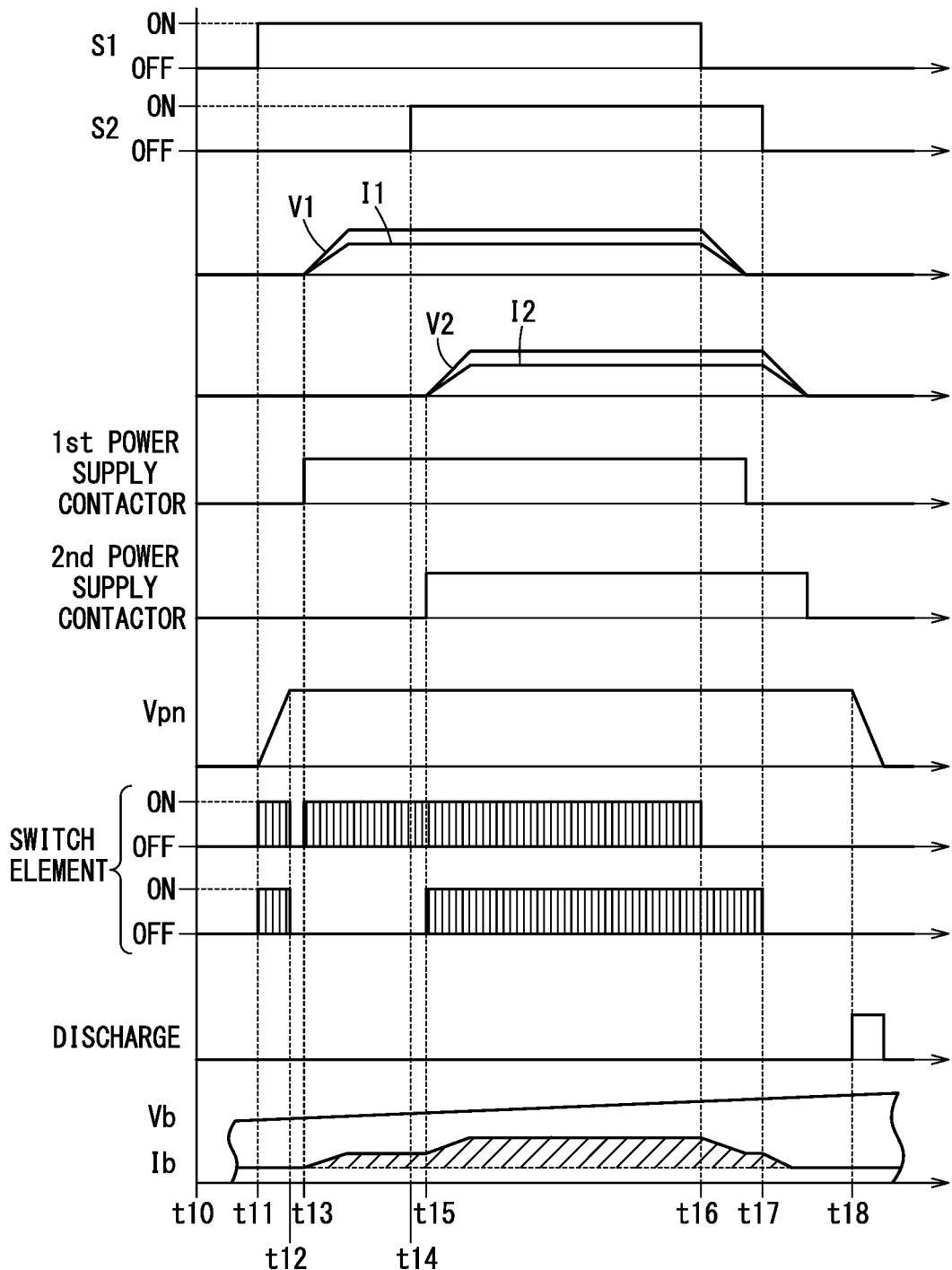
FIG. 3 is a sequence diagram of the first embodiment.
Figure 4:
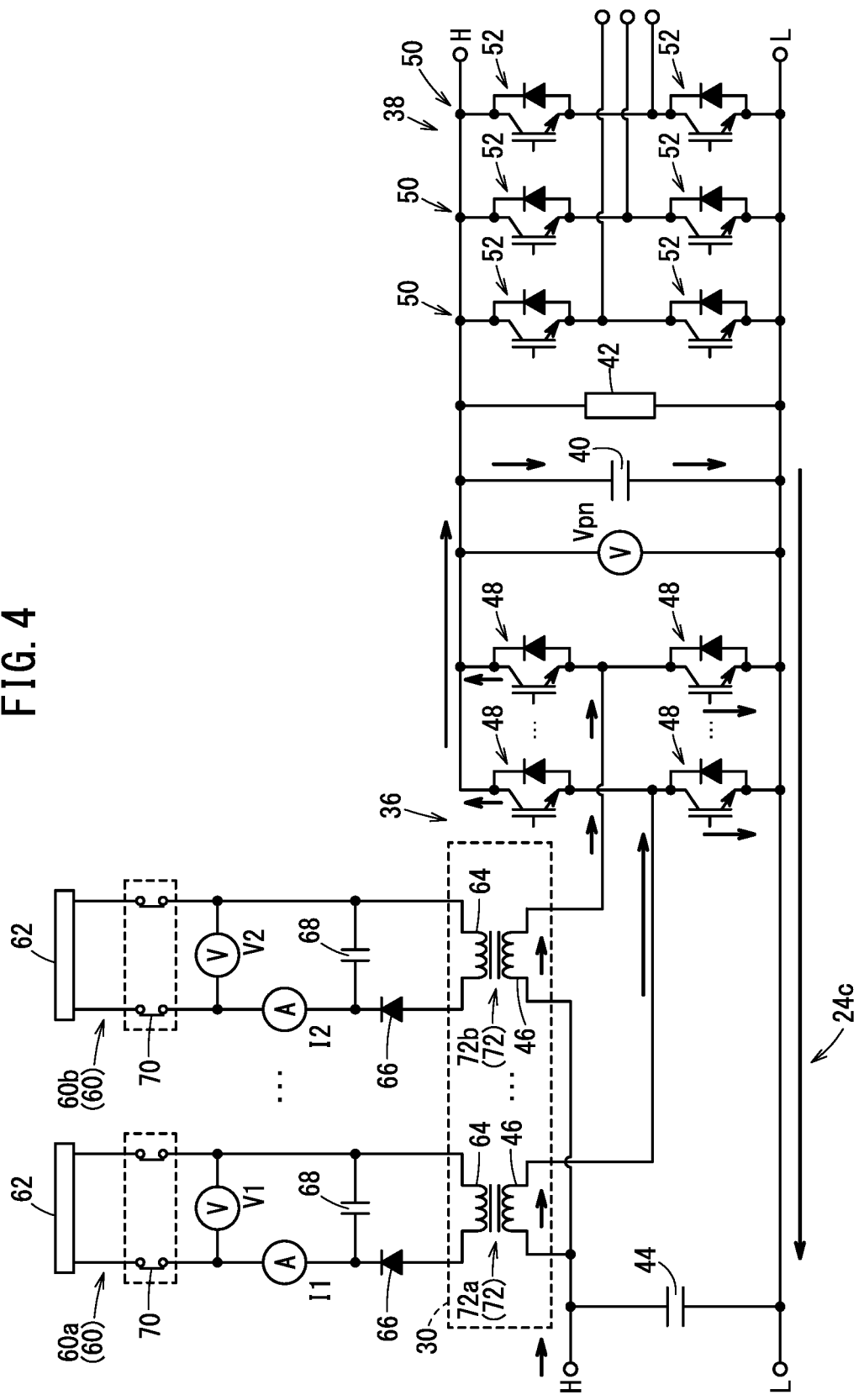
FIG. 4 is a diagram illustrating a current flow during initial charging according to the first embodiment.
Figure 5:
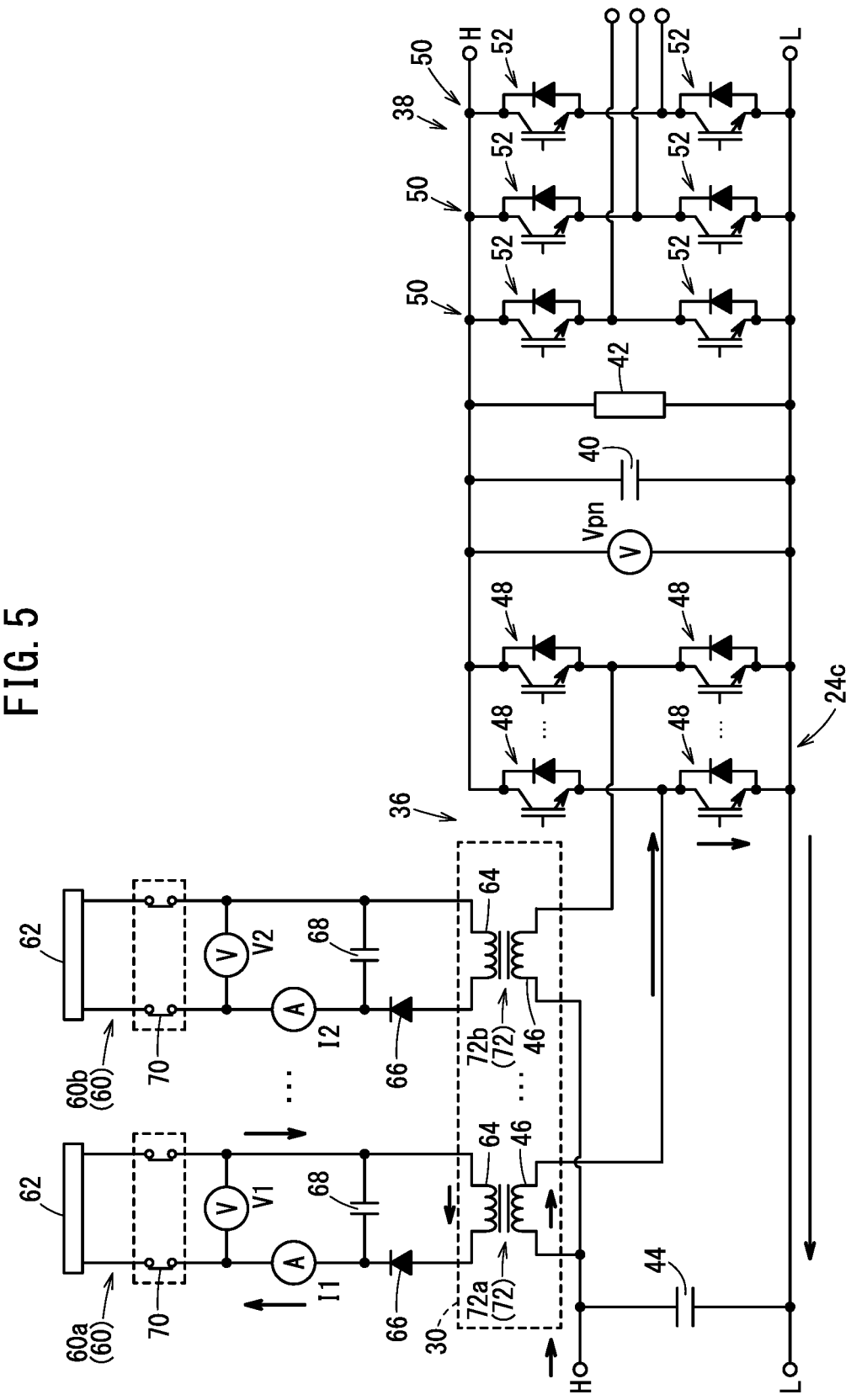
FIG. 5 is a diagram illustrating a current flow when power is supplied to a power supply target in the first embodiment.
Figure 6:
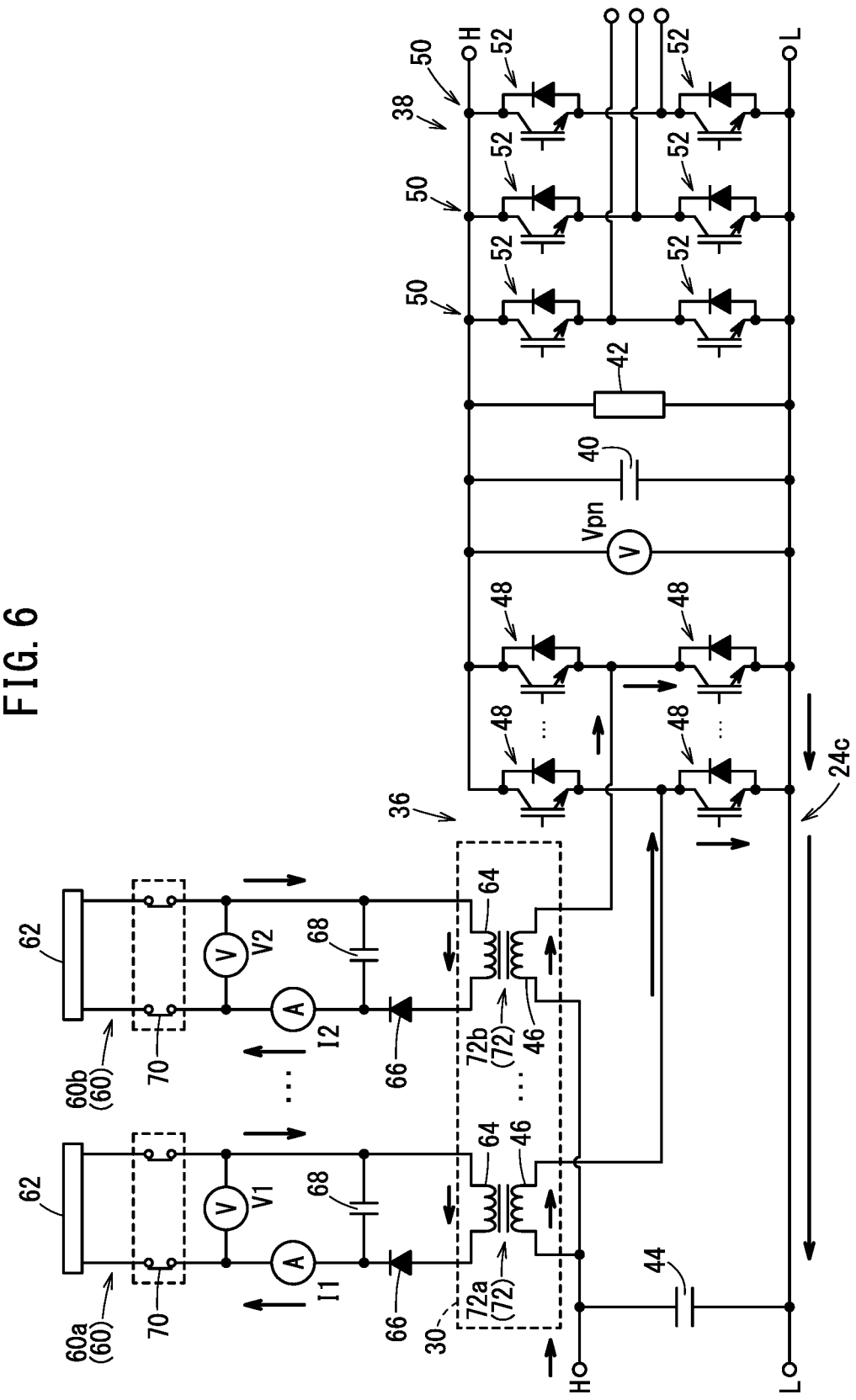
FIG. 6 is a diagram illustrating a current flow when power is supplied to a power supply target in the first embodiment.

FIG. 3 is a sequence diagram of the first embodiment. FIG. 3 is a sequence diagram showing a case where power is supplied to the power supply target 80 while charging the battery 20 of the moving body 14 with power supplied from the external power source 12. FIG. 4 is a diagram illustrating a current flow during initial charging according to the first embodiment. FIGS. 5 and 6 are diagrams illustrating a current flow when power is supplied to the power supply target 80 according to the first embodiment.

Prior to charging of the moving body 14, the connection device 16 is attached to the reactor attachment portion 30 of the moving body 14. Furthermore, a power supply target 80 is attached to the connector 62 of the connection device 16. Hereinafter, a mode in which two power supply targets 80 are connected to the moving body 14 via the connection device 16 will be described. A transformer 72 is formed by the internal reactor 46 and the external reactor 64. As a result, power can be supplied from the moving body 14 to the power supply target 80 via the connection circuit 60.

A user of the moving body 14 operates an operation device provided in the moving body 14, a smartphone, or the like, to instruct a charging condition. The charging condition includes information on the power supply order of the two power supply targets 80, information on the power supply timing, and the like. The first control device 28a regards electric power charged in a state where the SOC of the battery 20 is equal to or greater than a threshold value, as surplus electric power. For example, the user specifies the threshold value of the SOC of the battery 20. In this case, at the time when the SOC of the battery 20 increases and reaches the threshold value, the first control device 28a starts supplying part or all of the surplus power to the power supply target 80.

When the charging gun 18 of the external power source 12 is attached to the charging inlet 26, the charging inlet 26 outputs a connection signal to the first control device 28a. Then, the following processing is started. The first control device 28a calculates the SOC from the voltage Vb, the current Ib, and the temperature of the battery 20 during the following processing.

At the time t10, the first control device 28a supplies an excitation current to the first contactor 32 and the second contactor 34. Then, charging of the battery 20 is started.

At time t11, the SOC of the battery 20 reaches a specified first SOC. At this time, the first control device 28a determines that surplus power has been generated in the moving body 14. The first control device 28a determines to supply the surplus power of the moving body 14 to the power supply target 80 whose power supply order is the first. The first control device 28a transmits a power supply start signal (ON signal) to the second control device 28b in order to start power supply to the power supply target 80 whose power supply order is the first. The power supply start signal is a signal indicating the charging control instruction S1 of the power supply target 80 whose power supply order is the first.

Further, the first control device 28a controls ON/OFF of the low-side switch element of each switch unit 48 of the DC-DC converter circuit 36 so that the voltage Vpn between the input terminals of the inverter circuit 38 becomes higher than the voltage Vb of the battery 20. Then, a current flows as indicated by an arrow in FIG. 4, and the smoothing capacitor 40 is initially charged.

At time t12, the voltage Vpn becomes higher than the voltage Vb. The first control device 28a temporarily turns off each switch element of each switch unit 48 of the DC-DC converter circuit 36, and ends the initial charging of the smoothing capacitor 40. In this way, no current flows from the DC-DC converter circuit 36 to the inverter circuit 38.

At the time t13, the second control device 28b operates in response to the power supply start signal. That is, the second control device 28b supplies the excitation current to the power supply contactor 70 of a connection circuit 60a to which the power supply target 80 having the first in order of power supply is connected. Then, the power supply contactor 70 of the connection circuit 60a is switched from off to on. Further, the first control device 28a controls ON/OFF of the low-side switch element of each switch unit 48 connected to the connection circuit 60a via a transformer 72a. Then, power is supplied to the connection circuit 60a via the transformer 72a, and the voltage V1 and the current I1 of the connection circuit 60a rise. At this time, a current flows as indicated by an arrow in FIG. 5, and power is supplied to the power supply target 80 having the first in order of power supply.

At time t14, the SOC of the battery 20 reaches the specified second SOC. At this time, the first control device 28a determines that further power supply is possible with the surplus power. The first control device 28a determines that the surplus power of the moving body 14 is supplied to the power supply target 80 whose power supply order is the second. The first control device 28a transmits a power supply start signal (ON signal) to the second control device 28b in order to start power supply to the power supply target 80 whose power supply order is the second. The power supply start signal is a signal indicating the charging control instruction S2 of the power supply target 80 whose power supply order is the second.

At the time t15, the second control device 28b operates in response to the power supply start signal. That is, the second control device 28b supplies the excitation current to the power supply contactor 70 of a connection circuit 60b to which the power supply target 80 having the second in order of power supply is connected. Then, the power supply contactor 70 of the connection circuit 60b is switched from off to on. Further, the first control device 28a controls ON/OFF of the low-side switch element of each switch unit 48 connected to the connection circuit 60b via a transformer 72b. Then, power is supplied to the connection circuit 60b via the transformer 72b, and the voltage V2 and the current I2 of the connection circuit 60b rise. At this time, a current flows as indicated by an arrow in FIG. 6, and power is supplied to the power supply target 80 having the first power supply order and the power supply target 80 having the second power supply order.

At the time point t16, the first control device 28a determines to stop supplying power to the power supply target 80 whose power supply order is the first. The first control device 28a transmits a power supply stop signal (OFF signal) to the second control device 28b in order to stop power supply to the power supply target 80 whose power supply order is the first. The power supply stop signal is a signal indicating the charging control instruction S1 of the power supply target 80 whose power supply order is the first. Further, the first control device 28a turns off each switch element of each switch unit 48 connected to the connection circuit 60a via the transformer 72a. Then, the power supply to the connection circuit 60a is stopped, and the voltage V1 of the connection circuit 60a and the current I1 of the connection circuit 60a decrease. The second control device 28b operates in response to the power supply stop signal. That is, the second control device 28b stops the excitation current to the power supply contactor 70 of the connection circuit 60a to which the power supply target 80 having the first power supply order is connected. Then, the power supply contactor 70 of the connection circuit 60a is switched from ON to OFF.

At the time point t17, the first control device 28a determines to stop supplying power to the power supply target 80 whose power supply order is the second. The first control device 28a transmits a power supply stop signal (OFF signal) to the second control device 28b in order to stop power supply to the power supply target 80 whose power supply order is the second. The power supply stop signal is a signal indicating the charging control instruction S2 of the power supply target 80 whose power supply order is the second. Further, the first control device 28a turns off each switch element of each switch unit 48, of the DC-DC converter circuit 36, connected to the connection circuit 60b via the transformer 72b. Then, the power supply to the connection circuit 60b is stopped, and the voltage V2 of the connection circuit 60b and the current I2 of the connection circuit 60b decrease. The second control device 28b operates in response to the power supply stop signal. That is, the second control device 28b stops the excitation current to the power supply contactor 70 of the connection circuit 60b to which the power supply target 80 having the second power supply order is connected. Then, the power supply contactor 70 of the connection circuit 60b is switched from ON to OFF.

At time t18, the first control device 28a terminates the charging of the battery 20. At this time, the first control device 28a turns off each switch element of each switch unit 48 of the DC-DC converter circuit 36. Then, electric charge accumulated in the discharge unit 42 is discharged by the discharge unit 42, and the voltage Vpn between the input terminals of the inverter circuit 38 decreases. Thus, the process of supplying the surplus power to the power supply target 80 located outside (i.e., the external power supply target) ends, while charging the battery 20.

2. Second Embodiment

[2-1. Configuration of Power Supply System 10]

Figure 7:
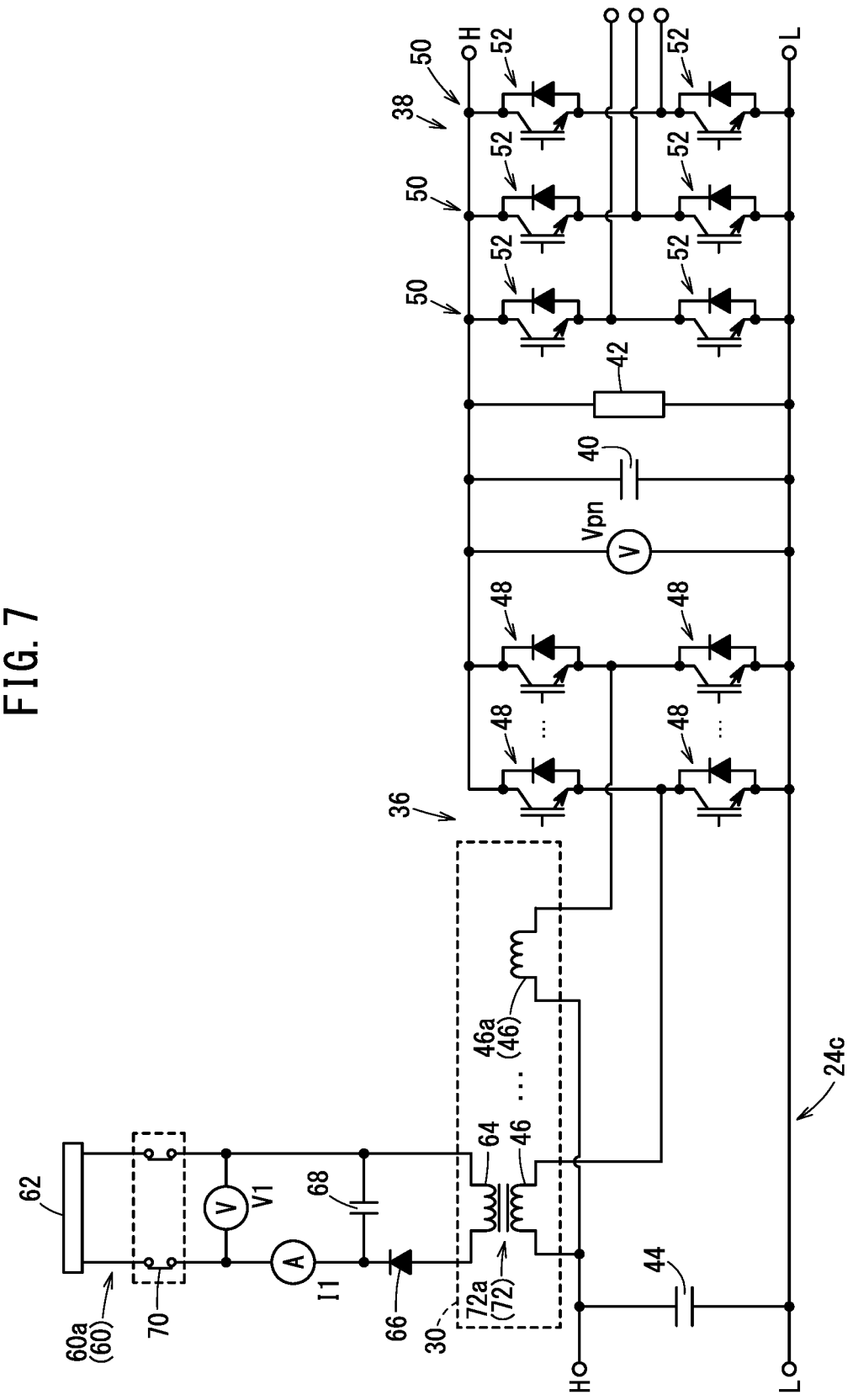
FIG. 7 is a diagram illustrating a third power feeding path according to a second embodiment and a connection circuit according to the second embodiment.

FIG. 7 is a diagram illustrating a third power feeding path 24c according to the second embodiment and a connection circuit 60 according to the second embodiment. The electric drive source 22 functions as a generator when a power source such as an engine is used. In the moving body 14 of the second embodiment, when the electric drive source 22 is used as a generator, the battery 20 can be charged with electric power generated by the electric drive source 22. For example, the moving body 14 may be a hybrid vehicle (HV), a fuel cell vehicle (FCV), or the like, in addition to the moving bodies 14 of the first embodiment. In the power supply system 10 according to the second embodiment, the external power source 12 and the second power feeding path 24b described in the first embodiment are not used.

Further, in the moving body 14 of the second embodiment, at least one internal reactor 46a of the DC-DC converter circuit 36 is used when power generated by the electric drive source 22 is stepped down and supplied to the battery 20. Therefore, the internal reactor 46a does not need to be provided in the reactor attachment portion 30.

[2-2. Power Supply from Moving Body 14 to Power Supply Target 80]

Figure 8:
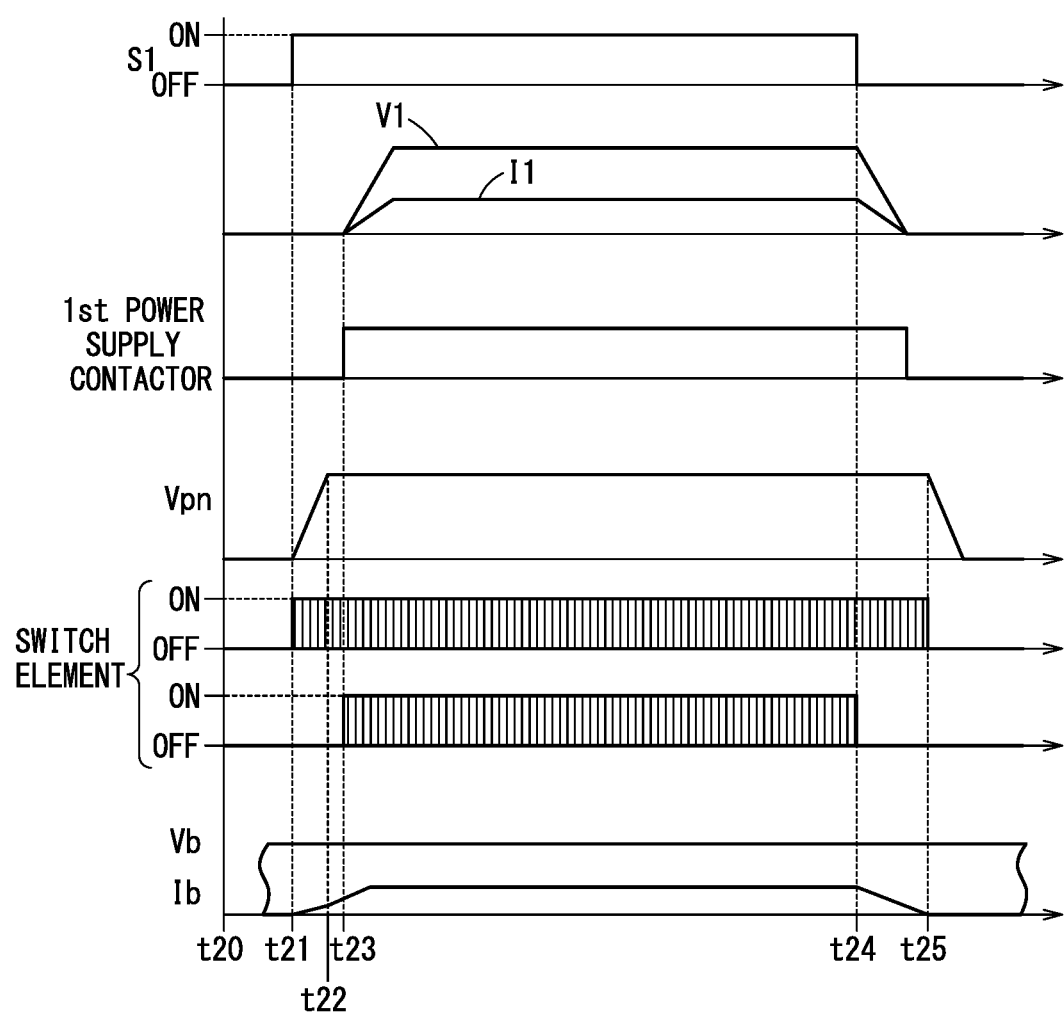
FIG. 8 is a sequence diagram of the second embodiment.
Figure 9:
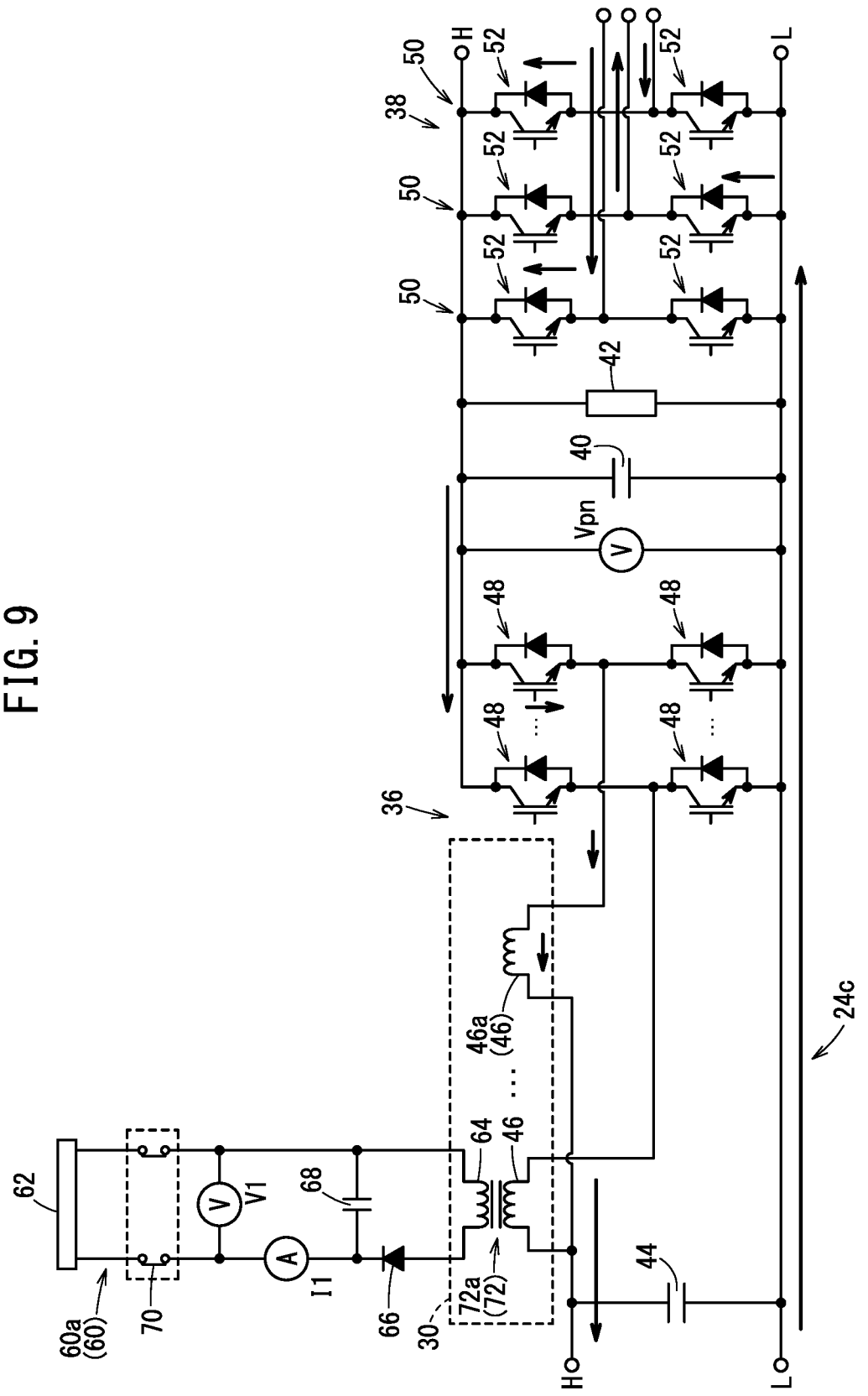
FIG. 9 is a diagram illustrating a current flow during battery charging according to the second embodiment.
Figure 10:
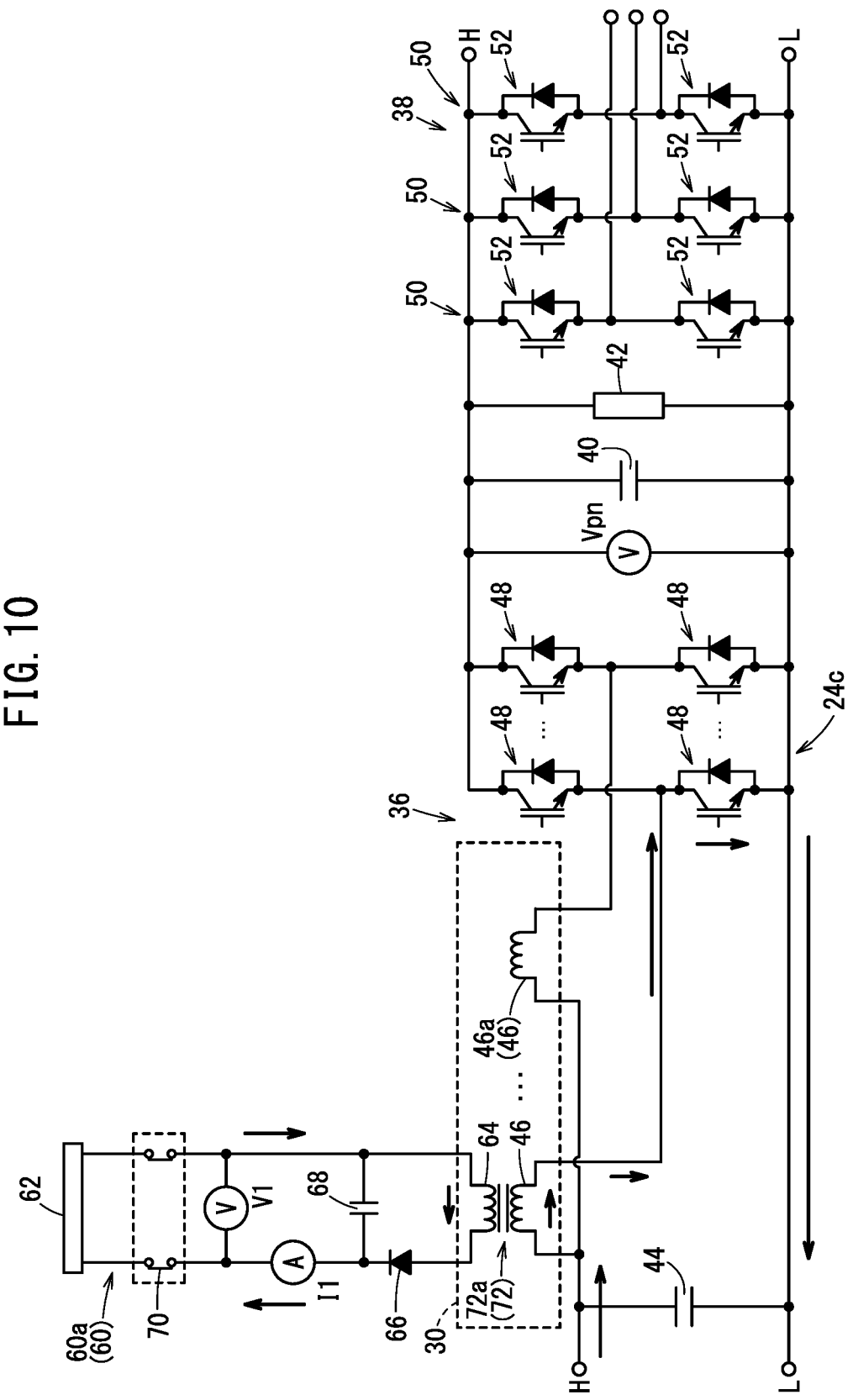
FIG. 10 is a diagram illustrating a current flow when power is supplied to a power supply target in the second embodiment.

FIG. 8 is a sequence diagram of the second embodiment. FIG. 9 is a diagram illustrating a current flow during battery charging according to the second embodiment; and FIG. 10 is a diagram illustrating a current flow when power is supplied to the power supply target 80 in the second embodiment.

Prior to charging of the moving body 14, the connection device 16 is attached to the reactor attachment portion 30 of the moving body 14. Furthermore, a power supply target 80 is attached to the connector 62 of the connection device 16. Hereinafter, a mode in which one power supply target 80 is connected to the moving body 14 via the connection device 16 will be described. A transformer 72 is formed by the internal reactor 46 and the external reactor 64. As a result, power can be supplied from the moving body 14 to the power supply target 80 via the connection circuit 60.

At the time point t21, when an engine (not shown) included in the moving body 14 is started, the electric drive source 22 generates electric power. At this time, the first control device 28a determines that the surplus power of the moving body 14 is to be supplied to the power supply target 80 whose power supply order is the first. The first control device 28a transmits a power supply start signal (ON signal) to the second control device 28b in order to start power supply to the power supply target 80 whose power supply order is the first. The power supply start signal is a signal indicating the charging control instruction S1 of the power supply target 80 whose power supply order is the first.

Further, the first control device 28a controls ON/OFF of each switch element of each switch unit 52 of the inverter circuit 38, and outputs a DC current (direct current) from the inverter circuit 38 to the DC-DC converter circuit 36. At this time, the smoothing capacitor 40 is charged. Further, the first control device 28a controls ON/OFF of the high-side switch element of the switch unit 48 connected to the internal reactor 46a. Then, as indicated by an arrow in FIG. 9, a current flows from the secondary terminal of the DC-DC converter circuit 36 toward the primary terminal of the DC-DC converter circuit 36. Then, at the time point t22, the voltage Vpn becomes higher than the voltage Vb.

At the time t23, the second control device 28b operates in response to the power supply start signal. That is, the second control device 28b supplies the excitation current to the power supply contactor 70 of the connection circuit 60a to which the power supply target 80 having the first in order of power supply is connected. Then, the power supply contactor 70 of the connection circuit 60a is switched from off to on. Further, the first control device 28a controls ON/OFF of the low-side switch element of each switch unit 48 connected to the connection circuit 60a via the transformer 72a. Then, power is supplied to the connection circuit 60a via the transformer 72a, and the voltage V1 and the current I1 of the connection circuit 60a rise. At this time, a current flows from the battery 20 as indicated by the arrow in FIG. 10, and power is supplied to the power supply target 80 whose power supply order is the first.

At the time point t24, the first control device 28a determines to stop supplying power to the power supply target 80 whose power supply order is the first. The first control device 28a transmits a power supply stop signal (OFF signal) to the second control device 28b in order to stop supply of power to the power supply target 80 whose power supply order is the first. The power supply stop signal is a signal indicating the charging control instruction S1 of the power supply target 80 whose power supply order is the first. Further, the first control device 28a turns off each switch element of each switch unit 48, of the DC-DC converter circuit 36, connected to the connection circuit 60a. Then, the power supply to the connection circuit 60a is stopped, and the voltage V1 of the connection circuit 60a and the current I1 of the connection circuit 60a decrease. The second control device 28b operates in response to the power supply stop signal. That is, the second control device 28b stops the excitation current to the power supply contactor 70 of the connection circuit 60a to which the power supply target 80 having the first power supply order is connected. Then, the power supply contactor 70 of the connection circuit 60a is switched from ON to OFF.

At time t25, the first control device 28a terminates the charging of the battery 20. At this time, the first control device 28a turns off each switch element of each switch unit 48 of the DC-DC converter circuit 36. Further, when the user stops the engine or the like, the electric drive source 22 stops power generation. Then, electric charge accumulated in the discharge unit 42 is discharged by the discharge unit 42, and the voltage Vpn between the input terminals of the inverter circuit 38 decreases. Thus, the process of supplying surplus power to the external power supply target 80 ends.

3. Modification

In the first embodiment and the second embodiment, the connection device 16 is connected to the moving body 14 from the outside. However, part of the circuit of the connection device 16 may be provided in the moving body 14. Alternatively, the connection device 16 itself may be provided in the moving body 14. In short, the power supply system 10 of the present invention includes one that uses the internal reactor 46 of the DC-DC converter circuit 36 as part of the transformer 72 to supply the surplus power of the battery 20 to the power supply target 80.

4. Technical Idea Obtained from Embodiments

Technical ideas that can be grasped from the above-described embodiments and modifications are described below.

According to the first aspect of the present invention, there is provided a power supply system 10 for supplying power from a moving body 14 including a battery 20 and an electric drive source 22 to an external power supply target 80 (i.e., a power supply target located outside), the power supply system including a DC-DC converter circuit 36 provided in an internal power feeding path 24 between the battery 20 and the electric drive source 22, a connection circuit 60 capable of electrically connecting the DC-DC converter circuit 36 and a power receiving terminal (power supply inlet 82) of the power supply target 80, and a control device 28 configured to control the DC-DC converter circuit 36 in a manner that surplus power of the battery 20 is supplied to the power supply target 80 via the DC-DC converter circuit 36 and the connection circuit 60.

According to the above-described configuration, when electric power supplied from the external power source 12 or the electric drive source 22 is supplied to the battery 20 of the moving body 14, electric power is supplied to the external power supply target 80 via the existing circuit (the DC-DC converter circuit 36) in the internal power feeding path 24 of the moving body 14. As described above, since the DC-DC converter circuit 36 originally provided in the moving body 14 can be used for power supply, a new circuit design for supplying power from the moving body 14 to the power supply target 80 is not necessary. As a result, according to the above configuration, the device for supply of power can be simplified. Further, according to the above-described configuration, since power is supplied to at least one power supply target 80 by using the originally-provided DC-DC converter circuit 36, it is possible to reduce the number of components of a device for power supply. As a result, according to the above configuration, it is possible to suppress an increase in cost.

In the power supply system 10 according to the first aspect, the DC-DC converter circuit 36 may include an internal reactor 46 configured to step up and step down a voltage and a switching circuit (switch unit 48) provided between the internal reactor 46 and the electric drive source 22, and when power is supplied from the moving body 14 to the power supply target 80, the control device 28 may operate the switching circuit such that power is supplied from the moving body 14 to the power supply target 80 via the internal reactor 46.

According to the above configuration, by using the internal reactor 46 of the DC-DC converter circuit 36 as the transformer 72 for supply of power to external equipment or the like, the number of components of a device for the supply of power can be reduced. Therefore, according to the above-described configuration, it is possible to suppress an increase in cost.

In the power supply system 10 of the first aspect, the DC-DC converter circuit 36 may include an internal reactor 46 and a switching circuit (switch unit 48) provided between the internal reactor 46 and the electric drive source 22, the connection circuit 60 may include an external reactor 64, the internal reactor 46 and the external reactor 64 may form a transformer 72, and when power is supplied from the moving body 14 to the power supply target 80, the control device 28 may operate the switching circuit in a manner that power is supplied from the moving body 14 to the power supply target 80 via the transformer 72.

According to the above configuration, by using the internal reactor 46 of the DC-DC converter circuit 36 as the transformer 72 for supply of power to external equipment or the like, the number of components of a device for the supply of power can be reduced. Therefore, according to the above-described configuration, it is possible to reduce costs.

In the power supply system 10 of the first aspect, the moving body 14 may include a plurality of the internal reactors 46, and the power receiving terminal of the power supply target 80 may be electrically connected to each of the plurality of the internal reactors 46 via the connection circuit 60.

According to the above-described configuration, it is possible to supply power to a plurality of power supply targets 80 with one moving body 14. Therefore, according to the above configuration, supply of power to external equipment can be efficiently performed.

In the power supply system 10 according to the first aspect, the moving body 14 may include a plurality of the internal reactors 46, and part of the plurality of internal reactors 46 may be used only when power generated by the electric drive source 22 is stepped down and supplied to the battery 20.

According to the above-described configuration, a circuit configuration for supplying power generated by the moving body 14 to the battery 20 and a circuit configuration for supplying, to the power supply target 80, power supplied from the external power source 12 can be separated from each other.

In the power supply system 10 according to the first aspect, the connection circuit 60 may include a contactor (power supply contactor 70), and the control device 28 may control opening and closing of the contactor.

In the power supply system 10 of the first aspect, the control device 28 may include a first control device 28a that controls the DC-DC converter circuit 36 and a second control device 28b that controls the connection circuit 60. The first control device 28a may determine start and stop of supply of power to the power supply target 80 based on the surplus power and output a determination result to the second control device 28b, and the second control device 28b may control opening and closing of the contactor according to the determination result.

According to the above configuration, it is possible to appropriately charge the power supply target 80 in accordance with the surplus power of the moving body 14.

In the power supply system 10 of the first aspect, in a case where a plurality of the power supply targets 80 are connected to the moving body 14, the first control device 28a may determine to which power supply target 80 the supply of power is to be started based on the surplus power.

According to the above configuration, it is possible to appropriately supply power to the power supply target 80 in accordance with the surplus power of the moving body 14. Therefore, the efficiency of supply of power is improved.

In the power supply system 10 of the first aspect, the control device 28 may control the DC-DC converter circuit 36 in a manner that the surplus power generated when the battery 20 is charged with power supplied from the external power source 12 is supplied to the power supply target 80.

In the power supply system 10 of the first aspect, the control device 28 may control the DC-DC converter circuit 36 in a manner that the surplus power generated when the battery 20 is charged with power generated by the electric drive source 22 is supplied to the power supply target 80.

In the power supply system 10 of the first aspect, the connection circuit 60 may be attachable to and detachable from the moving body 14.

According to the second aspect of the present invention, there is provided a moving body 14 including a battery 20 and an electric drive source 22, the moving body being configured to supply power to an external power supply target 80, the moving body including: a DC-DC converter circuit 36 provided in an internal power feeding path 24 between the battery 20 and the electric drive source 22, the DC-DC converter circuit including an internal reactor 46 and a switching circuit (switch unit 48) provided between the internal reactor 46 and the electric drive source 22; a reactor attachment portion 30 configured to hold an external reactor 64 in a manner that the external reactor 64 and the internal reactor 46 form a transformer 72, the external reactor being electrically connected to the power supply target 80; and a control device 28 configured to control the DC-DC converter circuit 36 in a manner that surplus power of the battery 20 is supplied to the power supply target 80 via the transformer 72 when the external reactor 64 is held by the reactor attachment portion 30.

The present invention is not particularly limited to the embodiments described above, and various modifications are possible without departing from the essence and gist of the present invention.

What is claimed is:

1. A power supply system for supplying power from a moving body including a battery and an electric drive source to an external power supply target, the power supply system comprising:
    a DC-DC converter circuit provided in an internal power feeding path between the battery and the electric drive source;
    a connection circuit configured to electrically connect the DC-DC converter circuit and a power receiving terminal of the power supply target; and
    a control device configured to control the DC-DC converter circuit in a manner that surplus power of the battery is supplied to the power supply target via the DC-DC converter circuit and the connection circuit;
    wherein the connection circuit includes a contactor, wherein the control device includes:
        a first control device configured to control the DC-DC converter circuit; and
        a second control device configured to control the connection circuit, and
    wherein the first control device determines start and stop of supply of power to the power supply target based on the surplus power, and outputs a determination result to the second control device, and
    the second control device controls the opening and closing of the contactor according to the determination result.

2. The power supply system according to claim 1, wherein:
    the DC-DC converter circuit includes an internal reactor configured to step up and step down a voltage and a switching circuit provided between the internal reactor and the electric drive source; and
    when power is supplied from the moving body to the power supply target, the control device operates the switching circuit in a manner that power is supplied from the moving body to the power supply target via the internal reactor.

3. The power supply system according to claim 1, wherein:
    the DC-DC converter circuit includes an internal reactor and a switching circuit provided between the internal reactor and the electric drive source;
    the connection circuit includes an external reactor;
    the internal reactor and the external reactor form a transformer; and
    when power is supplied from the moving body to the power supply target, the control device operates the switching circuit in a manner that power is supplied from the moving body to the power supply target via the transformer.

4. The power supply system according to claim 2, wherein:
    the moving body includes a plurality of the internal reactors; and
    the power receiving terminal of the power supply target is electrically connected to each of the plurality of internal reactors via the connection circuit.

5. The power supply system according to claim 3, wherein:
    the moving body includes a plurality of the internal reactors; and
    part of the plurality of internal reactors is used only when power generated by the electric drive source is stepped down and supplied to the battery.

6. The power supply system according to claim 1, wherein in a case where a plurality of the power supply targets are connected to the moving body, the first control device determines for which power supply target the supply of power is to be started, based on the surplus power.

7. The power supply system according to claim 1, wherein the control device controls the DC-DC converter circuit in a manner that the surplus power generated when the battery is charged with power supplied from an external power source is supplied to the power supply target.

8. The power supply system according to claim 1, wherein the control device controls the DC-DC converter circuit in a manner that the surplus power generated when the battery is charged with power generated by the electric drive source is supplied to the power supply target.

9. A power supply system for supplying power from a moving body including a battery and an electric drive source to an external power supply target, the power supply system comprising:

a DC-DC converter circuit provided in an internal power feeding path between the battery and the electric drive source;

a connection circuit configured to electrically connect the DC-DC converter circuit and a power receiving terminal of the power supply target; and a control device configured to control the DC-DC converter circuit in a manner that surplus power of the battery is supplied to the power supply target via the DC-DC converter circuit and the connection circuit, wherein the connection circuit is attachable to and detachable from the moving body.

10. A moving body including a battery and an electric drive source, the moving body being configured to supply power to an external power supply target, the moving body comprising:

a DC-DC converter circuit provided in an internal power feeding path between the battery and the electric drive source, the DC-DC converter circuit including an internal reactor and a switching circuit provided between the internal reactor and the electric drive source;

a connection circuit configured to electrically connect the DC-DC converter circuit and a power receiving terminal of the power supply target, and attachable to and detachable from the moving body;

a reactor attachment portion configured to hold an external reactor in a manner that the external reactor and the internal reactor form a transformer, the external reactor being electrically connected to the power supply target; and a control device configured to control the DC-DC converter circuit in a manner that surplus power of the battery is supplied to the power supply target via the transformer when the external reactor is held by the reactor attachment portion.

11. The power supply system according to claim 9, wherein:

the DC-DC converter circuit includes an internal reactor configured to step up and step down a voltage and a switching circuit provided between the internal reactor and the electric drive source; and when power is supplied from the moving body to the power supply target, the control device operates the switching circuit in a manner that power is supplied from the moving body to the power supply target via the internal reactor.

12. The power supply system according to claim 9, wherein:

the DC-DC converter circuit includes an internal reactor and a switching circuit provided between the internal reactor and the electric drive source;

the connection circuit includes an external reactor;

the internal reactor and the external reactor form a transformer; and when power is supplied from the moving body to the power supply target, the control device operates the switching circuit in a manner that power is supplied from the moving body to the power supply target via the transformer.

13. The power supply system according to claim 11, wherein:

the moving body includes a plurality of the internal reactors; and the power receiving terminal of the power supply target is electrically connected to each of the plurality of internal reactors via the connection circuit.

14. The power supply system according to claim 12, wherein:

the moving body includes a plurality of the internal reactors; and part of the plurality of internal reactors is used only when power generated by the electric drive source is stepped down and supplied to the battery.

15. The power supply system according to claim 9, wherein the control device controls the DC-DC converter circuit in a manner that the surplus power generated when the battery is charged with power supplied from an external power source is supplied to the power supply target.

16. The power supply system according to claim 9, wherein the control device controls the DC-DC converter circuit in a manner that the surplus power generated when the battery is charged with power generated by the electric drive source is supplied to the power supply target.

* * * * *